Aug. 28, 1956  A. J. RICHARD  2,761,004
INDUCTION FURNACE CONTROL METHOD AND APPARATUS
Filed Oct. 17, 1955    2 Sheets-Sheet 1

Inventor:
Armond J. Richard
by, *Richard E. Hosley*
His Attorney

Inventor:
Armond J. Richard
by, Richard E. Horley
His Attorney

United States Patent Office 2,761,004
Patented Aug. 28, 1956

2,761,004

INDUCTION FURNACE CONTROL METHOD AND APPARATUS

Armond J. Richard, Rochester, N. H., assignor to General Electric Company, a corporation of New York Application October 17, 1955, Serial No. 540,992

9 Claims. (Cl. 13—29)

This invention relates to electric induction furnaces, and, more particularly, to a novel control method and apparatus for preventing clogging of the channels in an induction furnace of the type having two chambers with cross-over channels.

A known type of induction furnace comprises a pair of chambers which are connected by two channels to provide a single turn secondary winding for the furnace transformer for the purpose of introducing energy into the furnace. The two channels are small in cross-section relative to the size of the chambers and all molten metal in the furnace flows through them at some time.

Furnaces of this type are customarily used to melt non-ferrous metals, because, in general, the maximum temperature obtainable in such a furnace is insufficient to melt ferrous metals. If it is desired to control the temperature of the furnace to less than its full heat, temperature sensitive means are provided to open and close the circuit through the primary winding of the furnace transformer to maintain the temperature at the desired value; that is, the furnace operates alternately at full heat and at zero heat to maintain the desired average temperature. Heretofore, the usefulness of such furnaces has been limited by the fact that the two channels through which the molten metal flows between the chambers have a tendency to clog. Such clogging is believed to be due to a direct current component of current flowing through the single turn secondary winding of the furnace transformer which magnetizes any unmelted ferrous impurities in the melt. Thus, the magnetized impurities bunch together and eventually restrict the flow of molten metal through the channels to the point where the furnace must be shut down. It then becomes necessary to remove the solidified metal from the channels, which is both an expensive and time consuming operation.

Therefore, the primary objective of the present invention is to provide a method and apparatus for preventing clogging of the channels in a two chamber type of induction furnace having a pair of cross-over channels arranged to provide a single turn secondary winding on the furnace transformer.

Another object is to provide apparatus for carrying out the method of the invention that comprises conventional, readily obtainable components.

With furnaces of the type as described above, it is customary to utilize an ignitron contactor to control the flow of current supplied to the furnace transformer primary winding. A pair of ignitron tubes are so connected in the contactor circuit that one ignitron passes current during one half of each alternating current cycle and the other ignitron passes current during the remaining half cycle. An ignitron is essentially a high current rectifier device having a pool of liquid mercury as its cathode, a large carbon anode and an igniter which starts the flow of current through the tube. When the potential difference between the anode and the cathode becomes sufficiently great and current is flowing between the igniter and the cathode, electrons are driven from the surface of the mercury pool cathode and attracted to the anode. Once conduction has started from anode to cathode (that is, the ignitron has fired), it continues until the potential of the anode of the ignitron becomes less than that of the cathode.

The current that flows through the ignitrons also flows through the primary winding of the furnace transformer which, of course, is a highly inductive load. It is customary to connect a bank of capacitors into the circuit in order to correct the power factor of the load, but nevertheless in practice the power factor is seldom corrected to more than 90%. The fact that the power factor of the load is not 100% means that unless the current flow through the ignitrons is controlled so that it lags the voltage thereacross, unequal currents flow through the two ignitrons for a number of cycles after each closing of the temperature controlled switch in series with the ignitrons and the transformer primary winding.

It has been discovered that clogging of the channels of the furnace due to unequal current flow through the two ignitrons and the resulting direct current component of the current flowing through the single turn secondary winding of the transformer can be eliminated by delaying the firing of the ignitrons so that the current flowing therethrough lags the voltage thereacross by an angle corresponding to the power factor of the load. Therefore, in accordance with the invention, there is provided a phase shift circuit to delay the firing of the ignitrons by the proper amount. It has been found in practice that the provision of such a phase shift circuit substantially completely eliminates the clogging in the channels of the furnace that has taken place heretofore.

For a better understanding of the invention, together with further objects and advantages therefor, reference is made to the following description taken in conjunction with the accompanying drawing, in which Fig. 1 is a diagrammatic perspective view, with some parts broken away, of an induction furnace of the type to which the teachings of the invention may be applied;

Figure 1:
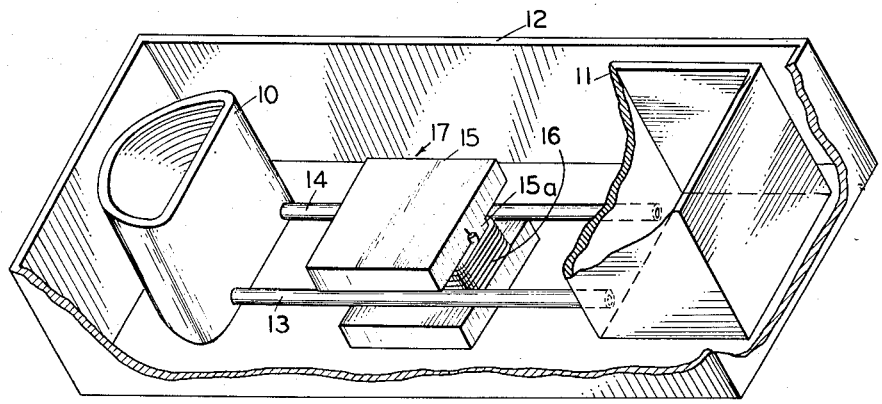

Fig. 1 shows in somewhat diagrammatic form a furnace of the type to which the teachings of the invention may be applied. The furnace comprises a pair of relatively large chambers 10 and 11 located at opposite ends of a heat insulating enclosure 12, and connected by a pair of channels 13 and 14 through which molten metal flows between the chambers. The channels 13 and 14 are located on each side of a substantially I-shaped core member 15 around the vertical portion 15A of which is wound a coil 16. The coil 16 constitutes the primary winding of a furnace transformer, designated generally by the numeral 17, having a single turn secondary winding comprising the electrically conductive material contained within the chambers 10, 11 and the connecting or cross-over channels 13 and 14. When alternating current flows through the primary winding 16 of the transformer 17, alternating current flow is induced in the single turn secondary winding to heat the metal in the chambers 10, 11 and cross-over channels 13, 14.

The chamber 10 may be provided with suitable means (not shown) for removing molten metal therefrom to die-cast or otherwise form into finished parts. The chamber 11 serves to permit new unmelted metal to be added to the melt without disturbing the operation of the furnace.

The changing magnetic flux through the cross-over channels 13, 14 when the primary winding 16 is energized by an alternating current causes molten metal to flow in one direction in one of the channels 13, 14 and in the opposite direction in the other channel. Thus, all molten metal in the furnace at some time or other passes through the channels 13 and 14.

Induction furnaces of the general type shown in Fig. 1 are generally employed to melt non-ferrous metals, because the maximum temperature obtainable therein is generally not high enough to melt ferrous metals. The cross-over channels 13 and 14 are of relatively small cross-section compared to the chambers 10 and 11. Hence, the cross-over channels have a tendency to clog. It has been discovered that such clogging is generally due to unmelted ferrous impurities in the molten non-ferrous metal flowing through the cross-over channels. Such clogging is believed to be caused by a direct current component of the current flowing through the single turn secondary winding of the transformer 17 which magnetizes the impurities and causes them to clump together. Thus, the flow through the cross-over channels 13, 14 may eventually be restricted to the point where the furnace must be shut down and the solidified metal removed from the cross-over channels or the channels themselves must be replaced. This has constituted an important limitation on the use of induction furnaces having single turn secondary windings with cross-over channels.

Figure 2:
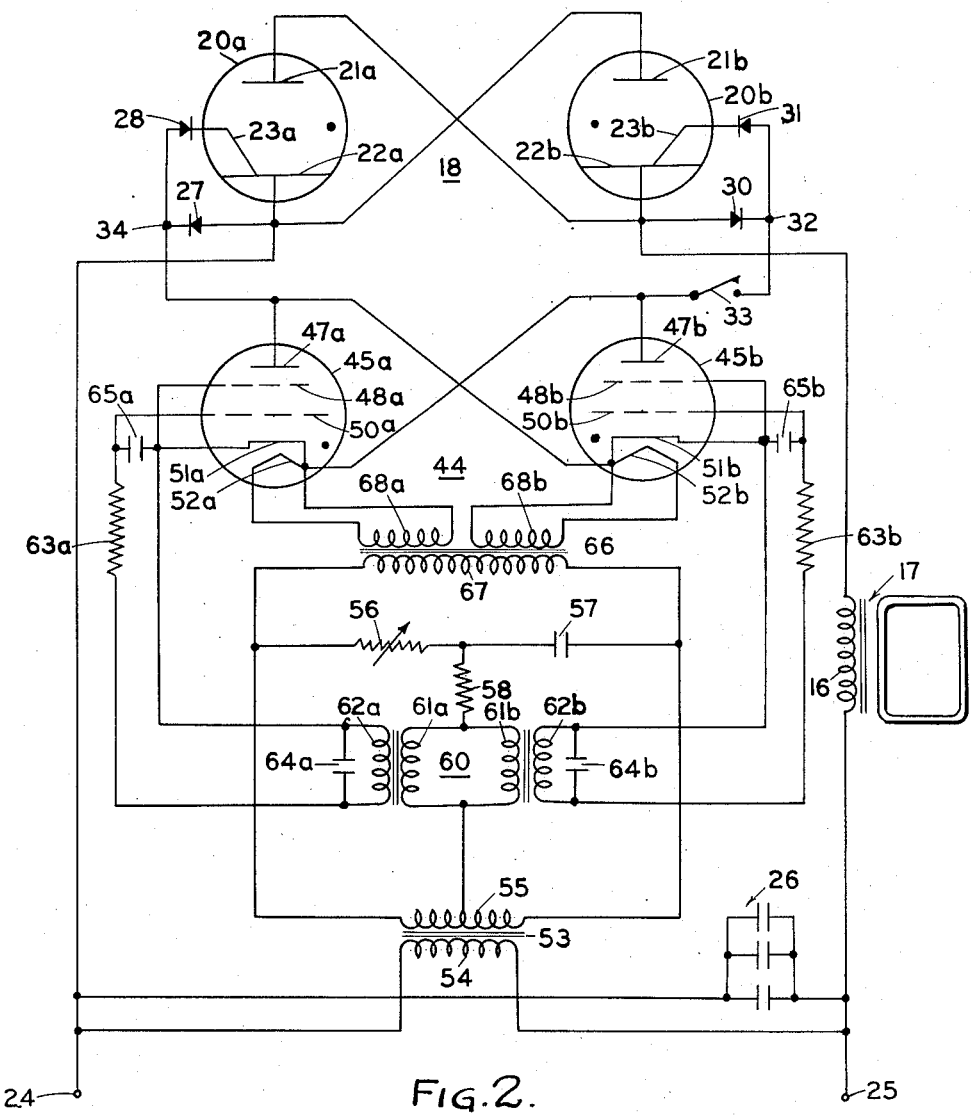
Fig. 2 is a circuit diagram of an apparatus for practicing the method of the invention.

Fig. 2 illustrates schematically a control circuit for an induction furnace of the type shown in Fig. 1 which embodies the teachings of the invention to prevent clogging of the cross-over channels. The flow of current through the primary winding 16 of the furnace transformer 17 is controlled by an ignitron contactor 18 comprising a pair of electrical discharge devices 20a and 20b connected in the well known back-to-back relationship. The discharge devices 20a and 20b are of the type known as ignitrons having respectively large carbon anodes 21a, 21b, pools of liquid mercury 22a, 22b as cathodes, and control elements 23a, 23b, having their ends immersed in the mercury pool cathodes 22a, 22b. The interior of each discharge device 20a, 20b contains mercury vapor. The invention is not limited to the use of discharge devices of the ignitron type and other discharge devices such as thyratrons may be utilized in the control circuit.

The anodes 21a, 21b and cathodes 22a, 22b of the discharge devices 20a and 20b are reversely connected in parallel with each other, and the cathode 22a of discharge device 20a may be connected to an alternating current supply conductor 24. The mercury pool cathode 22b of discharge device 20b is connected to one end of the primary winding 16 of furnace transformer 17 and the other end of the winding 16 is connected to another alternating current supply conductor 25. The supply conductors 24 and 25 may be energized from a conventional source (not shown) such as a 440 volt, 60 cycle circuit. Because the primary winding 16 of the furnace transformer 17 is highly inductive, a capacitor bank 26 is connected between the supply conductors 24 and 25 to correct the power factor of the circuit to the vicinity of 90%. Such power factor correction is well known in the art and further explanation is believed unnecessary.

The discharge device 20a is provided with a pair of rectifier elements 27 and 28 connected between its mercury pool cathode 22a and igniter 23a to permit current to flow from the igniter 23a to the cathode 22a and prevent current flow in the opposite direction. Discharge device 20b is similarly provided with rectifier elements 30 and 31. In operation, where the igniters 23a, 23b are sufficiently positive relative to their respective cathodes 22a, 22b, current flows from the igniters to the cathodes. When this occurs, arcs form where the igniters touch the mercury pool cathodes and large quantities of electrons are released from the surfaces of the mercury pools and attracted to the anodes 21a, 21b, assuming that the anodes are sufficiently positive relative to the cathodes 22a, 22b. Thus, a large current flow is initiated between each anode 21a, 21b and the respective cathode 22a, 22b.

Prior to the present invention, a point 32 between the rectifiers 30 and 31 was connected through a switch 33 to a point 34 between the rectifiers 27 and 28. With that arrangement, assuming that conductor 24 is positive and conductor 25 is negative and switch 33 was closed, current flowed from conductor 24 through rectifier 27 to point 34, then through switch 33 to point 32, through rectifier 31, igniter 23b and cathode 22b of discharge device 20b and through the primary winding 16 of the transformer 17 to conductor 25. This caused discharge device 20b to become conductive from anode 21b to cathode 22b, and current then flowed directly from conductor 24 through the anode 21b and cathode 22b of discharge device 20b and through transformer primary winding 16 to conductor 25. On the other half cycle of the alternating supply voltage, current flowed from conductor 25 through transformer primary winding 16, through rectifier 30 to point 32, from point 32 through switch 33 to point 34, through rectifier 28, and through igniter 23a and cathode 22a of discharge device 20a to the supply conductor 24. This caused discharge device 20a to become conductive from anode to cathode and current then flowed directly from conductor 25 through transformer primary winding 16, anode 21a and cathode 22a of discharge device 20a to the supply conductor 24. If it was desired to remove heat from the furnace, the switch 33 was opened to break the conducting path between the discharge devices 20a and 20b. The switch 33 may comprise a relay contact or other device which is controlled by temperature sensitive means (not shown) located within the furnace.

Figure 3:
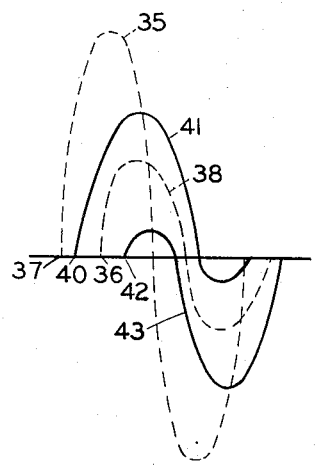
Fig. 3 is a graph showing wave forms useful in understanding the invention.

In the operation of the ignitron control circuit 18 prior to the present invention (as described above), it was found that current flow through the discharge devices 20a and 20b did not necessarily start at the proper point in each alternating voltage supply cycle. It is known that if a load on an electrical circuit is inductive in character, the current flowing therethrough lags the voltage thereacross by an amount depending upon the relative values of resistance and inductance in the circuit. The power factor is the cosine of the phase angle between the voltage and the current in the circuit. If current is caused to flow through the inductive load with a phase angle relative to the voltage thereacross that does not correspond to the power factor of the circuit, unequal currents flow during the positive and negative half cycles. Such unequal currents, which are known as transient currents, may exist for a number of cycles before they are smoothed out and equal currents flow during both halves of each cycle. Referring now to Fig. 3, which illustrates the effect of improper firing of the discharge devices 20a and 20b, the broken curve 35 represents the alternating voltage supply. For purposes of illustration, a point 36 has been shown as the proper point after the start of the positive portion of the supply voltage cycle to start current flow through the transformer primary winding 16 shown in Fig. 2. In other words, the phase difference between the point 36 and a point 37 at which the supply voltage becomes positive corresponds to the power factor of the circuit. Under these conditions, the current flow through the transformer primary winding, shown by curve 38, is equal during both halves of the cycle. If now current is caused to flow through the circuit starting earlier than at point 36, such as at a point 40, the current through the transformer primary winding represented by curve 41 is much greater during the positive portion of the cycle than during the negative portion. Therefore, there is a direct current component flowing through the transformer primary winding on which the alternating current component is superimposed. Similarly, if current flow starts at a point later than the point 36, such as at a point 42, the current flowing during the negative portion of the cycle is much greater than that flowing during the positive portion as shown by curve 43. It has been found that the direct component of current flowing through the transformer caused by improper firing of the discharge devices 20a and 20b magnetizes the ferrous impurities in the molten metal flowing in the transformer secondary loop and causes clogging. Therefore, in accordance with the invention, there is provided a phase shift circuit, identified generally by the numeral 44 in Fig. 2, to cause current to flow through the electron discharge devices 20a and 20b with the proper phase relationship relative to the voltage between supply conductors 24 and 25.

The phase shift circuit 44 comprises a pair of gas-filled electron discharge devices 45a and 45b of the type known as thyratrons, respectively provided with anodes 47a, 47b, screen grids 48a, 48b, control grids 50a, 50b, cathodes 51a, 51b and filaments 52a, 52b. The discharge devices 45a, 45b are connected in reverse parallel (back-to-back) arrangement similar to the ignitron discharge devices 20a, 20b. It is seen from the circuit diagram that in order for current to flow from conductor 25 through the igniter 23a and mercury pool cathode 22a of the discharge device 20a the current must also flow from the anode 47b to cathode 51b of the electron discharge device 45b. Similarly, the current that flows through the igniter 23b and mercury pool cathode 22b of discharge device 20b must flow from anode 47a to cathode 51a of the discharge device 45a. Thus, the flow of current through the ignitron discharge devices 20a and 20b may be controlled by controlling the flow of current through the thyratron discharge devices 45a and 45b. This is done by varying the phase of a voltage placed on the control grids of the discharge devices 45a and 45b, in a manner to be hereinafter described, to determine the time at which conduction is initiated through those devices.

The phase shifting circuit 44 includes a transformer 53 having a primary winding 54 and a secondary winding 55. The primary winding 54 of the transformer is connected between the supply conductors 24 and 25 and a variable resistor 56 and a capacitor 57 are connected in series across the secondary winding 55 of the transformer. The juncture of the variable resistor 56 and capacitor 57 is connected in the midpoint of transformer secondary winding 55 through a resistor 58 and a transformer 60 connected in series. The transformer 60 is provided with a pair of primary windings 61a and 61b and a pair of secondary windings 62a and 62b. The parallel primary windings 61a, 61b are connected in series with resistor 58, a secondary winding 62a is connected between the cathode 51a and control grid 50a of the discharge device 45a through a resistor 63a, and the other secondary winding 62b is similarly connected to the control grid 50b and cathode 51b of discharge device 45b through a resistor 63b. Capacitors 64a and 64b are connected across the secondary windings 62a and 62b, respectively, to provide tuned circuit that improves the operation of the phase shift circuit 42, as is well known in the art. Capacitors 65a and 65b are connected between the control grids and cathodes of discharge devices 45a and 45b, respectively, for suppressing transients between those elements.

A transformer 66 having a primary winding 67 and secondary windings 68a and 68b also has its primary winding 67 connected across the secondary winding 55 of transformer 53, and the secondary windings 68a, 68b of transformer 66 provide the proper filament voltages for thyratron discharge devices 45a and 45b, respectively.

Figure 4A:
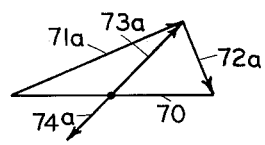
Figs. 4A, 4B and 4C are vector diagrams illustrating the operation of the phase shift circuit embodied in the invention, shown under various conditions.
Figure 4B:
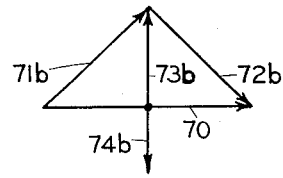
Figure 4C:
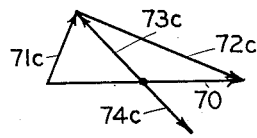

The operation of the phase shifting circuit 42 may be best understood by the vector diagrams shown in Figs. 4A, 4B and 4C. Looking first at Fig. 4A, a vector 70 represents the voltage across the secondary winding 55 of transformer 53. The magnitude of the current flowing through the variable resistor 56 and the capacitor 57 depends, of course, upon the impedance of the circuit.

As is well known, the current flowing through a resistor and capacitor in series differs in phase from the voltage impressed across the circuit by an amount depending upon the relative values of the resistor and capacitor. In Fig. 4A, it is assumed that the variable resistor 56 is adjusted to place the maximum amount of resistance in the circuit, which is assumed to be considerably greater than the impedance of capacitor 57. Thus, the voltage drop across the resistor 56 may be represented by the vector 71a with the voltage drop in phase with the current flowing through the resistor 56. The voltage developed across the capacitor 57 is 90° out of phase with the voltage developed across resistor 56 and is represented by the vector 72a. Therefore, the voltage across the primary windings 61a, 61b of transformer 60 represented by the vector 73a leads the voltage across the secondary winding 55 of transformer 53 represented by vector 70. The voltage developed across the secondary windings 62a, 62b of transformer 60 is 180° out of phase with the primary voltage and is represented by the vector 74a. That voltage lags the voltage across the secondary winding 55 of transformer 53, which is in phase with the voltage supplied to the anodes 47a, 47b of the discharge devices 45a and 45b.

If now the variable resistor 56 is adjusted so that its impedance is equal to that of capacitor 57, the voltage drops across the resistor and capacitor become equal as shown by the vectors 71B and 72B in Fig. 4B. Of course, the two voltages are still 90° out of phase. In that case, the voltage across the primary windings 61a, 61b of transformer 60 leads the voltage across the secondary winding 55 of transformer 53 by 90° as shown by the vector 73B, and, hence, the voltage across the secondary windings 62a, 62b lags by 90° the voltage across secondary winding 55 and the anode voltages of discharge devices 45a, 45b as shown by the vector 74B.

If the resistance of the variable resistor 56 is further decreased so that the majority of the voltage drop takes place across capacitor 57, the circuit conditions may be represented by the diagram of Fig. 4C, wherein the vector 71C represents the voltage drop across resistor 56 and vector 72C represents the voltage drop across capacitor 57. Again, of course, there is an angle of 90° between the vectors 71C and 72C. In this case, the voltage across transformer primary windings 61a, 61b represented by vector 73C leads the voltage across the secondary winding 55 of transformer 53 by a greater amount than before, and, hence, the voltage across transformer secondary windings 62a, 62b, represented by vector 74C, lags the voltage across transformer secondary winding 55 by a smaller amount.

It is seen from the diagrams of Figs. 4A, 4B and 4C that the voltage across the primary windings 61a, 61b of transformer 60 is constant in amplitude but may be varied in phase by adjusting variable resistor 56. Thus, it is possible to cause the voltage across transformer secondary windings 62a, 62b, which is supplied to the control grids 50a, 50b of discharge devices 45a and 45b, to have a desired phase relationship with respect to the anode voltages of these discharge devices.

Electron discharge devices of the thyratron type are so constructed that current flows from anode to cathode thereof only when the control grid of the device is approximately at the same potential as the cathode or is positive with respect to the cathode. By so constructing transformer 60 that the voltage developed across its secondary windings 62a, 62b is relatively large, and hence passes from negative to positive quickly, the time of conduction or firing of the devices 45a and 45b may be controlled quite closely.

Figure 5:
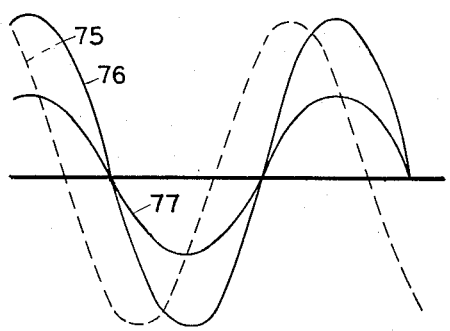
Fig. 5 is a graph showing wave forms at various points in the circuit of Fig. 2, when the phase shift circuit is properly adjusted.

It is now apparent that variable resistor 56 may be set at such a value as to cause the control grid voltages of the discharge devices 45a and 45b to lag the anode voltages by an angle that corresponds exactly to the power factor of the overall circuit. When this condition is met, the relationship shown in Fig. 5 are obtained. The anode voltages of the discharge devices 45a and 45b are represented by the curve 75 and the control grid voltages of those discharge devices are shown by the curve 76. If the phase difference between the curves 75 and 76 corresponds to the power factor of the circuit, the current through the ignitron discharge devices 20a, 20b is as shown by the curve 77. It is seen that the positive and negative portions of the curve 77 are of equal amplitude; thus, equal currents flow through the discharge devices 20a and 20b, and there is no D.-C. component of the current flowing through the primary winding 16 of the furnace transformer 17. Thus, there is no tendency to magnetize ferrous impurities that might exist in the molten metal flowing through the single turn secondary of the transformer 17, and clogging of the cross-over channels of the furnace is substantially completely eliminated.

It is apparent to one skilled in the art that many changes may be made in the circuitry that has been described; for example, the invention is not limited to the particular contactor circuit or phase shifting circuit shown and other circuits well known in the art may be substituted therefor without sacrificing the advantages of the invention. In addition, the invention contemplates the use of a control circuit wherein the ignitron discharge devices 20a and 20b may be connected in the well known leading tube-trailing tube arrangement. In the case illustrated, the time of firing of the discharge devices on each half cycle of the supply voltage is controlled. In the leading tube-trailing tube arrangement, it is necessary to control only the firing of the leading tube, and hence, a different phase shift circuit may be embodied in the control arrangement. Various other modifications will suggest themselves to one skilled in the art, and, hence, it is intended by the appended claims to cover all such modifications as fall within the true scope and spirit of the invention.

What I claim as new and desire to secure by Letters Patent of the United States is:

1. A method of preventing clogging in an induction furnace having a transformer with a primary winding and two chambers connected by a pair of cross-over channels to form a single turn secondary winding, which method comprises energizing said primary winding with an alternating voltage, and controlling the flow of current through said primary winding to cause equal currents to flow therethrough during both halves of each cycle of said alternating voltage.

2. A method of preventing clogging in an induction furnace having a transformer with a primary winding and two chambers connected by a pair of cross-over channels to form a single turn secondary winding, which method comprises energizing said primary winding with an alternating voltage, and controlling the flow of current through said primary winding to cause said current to lag said alternating voltage by an angle corresponding to the power factor of the circuit.

3. A method of preventing clogging in an induction furnace having a transformer with a primary winding and two chambers connected by a pair of cross-over channels to form a single turn secondary winding and having a pair of electric discharge devices connected in circuit with said primary winding to control the flow of current therethrough, which method comprises energizing said primary winding with an alternating voltage, and controlling the flow of current through said electric discharge devices to cause equal currents to flow through said primary winding during both halves of each cycle of said alternating voltage.

4. A method of preventing clogging in an induction furnace having a transformer with a primary winding and two chambers connected by a pair of cross-over channels to form a single turn secondary winding and having a pair of electric discharge devices connected in circuit with said primary winding to control the flow of current therethrough, which method comprises energizing said primary winding with an alternating voltage, and shifting the phase of the current flowing through said electric discharge devices relative to said alternating voltage to cause the current flowing through said primary winding to lag said alternating voltage by an angle corresponding to the power factor of the circuit.

5. A method of preventing clogging in an induction furnace having a transformer with a primary winding and two chambers connected by a pair of cross-over channels to form a single turn secondary winding and having a pair of electric discharge devices connected in circuit with said primary winding to control the flow of current therethrough, said electric discharge devices having control elements for controlling the conductivity of said devices, which method comprises energizing said primary winding with an alternating voltage, and providing a phase-shifted bias voltage on said discharge device control elements to cause the current flowing through said primary winding to lag said alternating voltage by an angle corresponding to the power factor of the circuit.

6. The combination comprising an induction furnace having a transformer with a primary winding and two chambers connected by a pair of cross-over channels to form a single turn secondary winding, discharge devices connected in series with said transformer primary winding between a pair of supply conductors and having control elements for controlling their conductivity, and phase shifting means connected in circuit with said discharge device control elements to shift the phase of current flow through said discharge devices relative to the potentials thereacross.

7. The combination comprising an induction furnace having a transformer with a primary winding and two chambers connected by a pair of cross-over channels to form a single turn secondary winding, a pair of electric discharge devices having anodes and cathodes reversely connected in parallel with one another between a supply conductor and one end of said transformer primary winding and having control elements for controlling their anode-cathode conductivity, the other end of said transformer primary winding being connected to another supply conductor, and phase shifting means connected in circuit with said discharge device control elements to shift the phase of current flow through said discharge devices relative to the anode potential thereof.

8. The combination comprising an induction furnace having a transformer with a primary winding and two chambers connected by a pair of cross-over channels to form a single turn secondary winding, a pair of electric discharge devices having anodes and cathodes reversely connected in parallel with one another between a supply conductor and one end of said transformer primary winding and having control elements for controlling their anode-cathode conductivity, the other end of said transformer primary winding being connected to another supply conductor, and phase shifting means connected between said supply conductors and said discharge device control elements to shift the phase of current flow through said discharge devices relative to the anode potential thereof.

9. The combination comprising an induction furnace having a transformer with a primary winding and two chambers connected by a pair of cross-over channels to form a single turn secondary winding; a first pair of electric discharge devices having anodes and cathodes reversely connected in parallel with one another between a supply conductor and one end of said transformer primary winding and having control elements for controlling their anode-cathode conductivity, the other end of said transformer primary winding being connected to another supply conductor; and phase shifting means connected in circuit with said discharge device control elements to shift the phase of current flow through said discharge devices relative to the anode potential thereof, said phase shifting means comprising a second pair of electric discharge devices having anodes and cathodes reversely connected in parallel between said control elements of said first pair of electric discharge devices, said second pair of discharge devices having control elements for controlling their anode-cathode conductivity, and means connected to the control element of at least one of said second pair of electric discharge devices for shifting the phase of current flow through said second pair of electric discharge devices relative to the anode potentials thereof.

References Cited in the file of this patent

UNITED STATES PATENTS 2,540,744   Lillienberg _____ Feb. 6, 1951